United States Patent
Nakajo (10) Patent No.: US 8,390,880 B2
(45) Date of Patent: Mar. 5, 2013

(54) PRINTING APPARATUS, METHOD AND PROGRAM FOR AUTOMATIC IMAGE QUALITY ADJUSTMENT BASED ON COMBINATION OF CORRECTION AMOUNTS AND DISPLAY OF IMAGE AND CORRECTION INFORMATION

(75) Inventor: Naoki Nakajo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 727 days.

(21) Appl. No.: 12/220,213

(22) Filed: Jul. 23, 2008

(65) Prior Publication Data

US 2009/0027706 A1 Jan. 29, 2009

(30) Foreign Application Priority Data

Jul. 23, 2007 (JP) ................................ 2007-190490

(51) Int. Cl.
 *H04N 1/40* (2006.01)
 *H04N 1/60* (2006.01)
 *G06T 5/00* (2006.01)
(52) U.S. Cl. ......... 358/1.9; 358/3.27; 358/518; 358/527
(58) Field of Classification Search .................. 358/1.9, 358/1.13, 518, 527, 537, 448, 452, 3.27; 382/254, 311; 715/274, 275; 345/589; 399/81; 455/566

See application file for complete search history.

(56) References Cited

U.S. PATENT DOCUMENTS

| | | | | |
|---|---|---|---|---|
| 4,692,797 | A * | 9/1987 | Matsumoto | 358/518 |
| 5,012,299 | A * | 4/1991 | Sawamura et al. | 399/81 |
| 5,119,182 | A * | 6/1992 | Tsuboi et al. | 358/500 |
| 5,870,683 | A * | 2/1999 | Wells et al. | 455/566 |
| 6,262,817 | B1 * | 7/2001 | Sato et al. | 358/518 |
| 6,748,119 | B1 * | 6/2004 | Bollman | 382/254 |
| 7,099,022 | B1 * | 8/2006 | Kawaoka | 358/1.9 |
| 7,324,749 | B2 * | 1/2008 | Kubo | 358/527 |
| 7,330,189 | B2 * | 2/2008 | Nichogi et al. | 345/589 |
| 7,444,038 | B2 * | 10/2008 | Shimizu et al. | 358/1.9 |
| 7,466,857 | B2 * | 12/2008 | Nishi et al. | 358/1.9 |
| 7,511,853 | B2 * | 3/2009 | Nakami | 358/1.9 |
| 7,589,863 | B2 * | 9/2009 | Kita | 358/1.9 |
| 7,664,335 | B2 * | 2/2010 | Kurumisawa et al. | 382/254 |
| 2005/0212914 | A1 | 9/2005 | Seto et al. | |

FOREIGN PATENT DOCUMENTS

| | | |
|---|---|---|
| JP | 08-317237 | 11/1996 |
| JP | 11-088672 | 3/1999 |
| JP | 11-345321 | 12/1999 |
| JP | 2001350467 A | 12/2001 |
| JP | 2005-096301 | 4/2005 |
| JP | 2005284411 A | 10/2005 |
| JP | 2005-342963 | 12/2005 |
| JP | 2006013618 A | 1/2006 |
| JP | 2006264012 A | 10/2006 |

* cited by examiner

*Primary Examiner* — Scott A Rogers
(74) *Attorney, Agent, or Firm* — Nutter McClennen & Fish LLP; John J. Penny, Jr.; Christina M. Sperry (57) ABSTRACT

A printing apparatus having a displaying portion, a display controlling unit, and a print controlling unit.

8 Claims, 8 Drawing Sheets

PRINTING APPARATUS, METHOD AND PROGRAM FOR AUTOMATIC IMAGE QUALITY ADJUSTMENT BASED ON COMBINATION OF CORRECTION AMOUNTS AND DISPLAY OF IMAGE AND CORRECTION INFORMATION

BACKGROUND

1. Technical Field

The present invention relates to a printing apparatus having a displaying unit, a controlling method of controlling the printing apparatus, and a program for causing one or more computers to execute processing steps of the controlling method.

2. Related Art

From the past, JP-A-1996-317237 and JP-A-2009-88672 disclose a system in which an inputted image undergoes image quality adjusting processing, the result of the pressing is displayed on a display panel, and then printing processing for the image is performed.

In such a system, a user can print an image after checking the result of the image quality adjusting processing for the selected image. Accordingly, it is convenient to use the system.

By the way, in even the printer having a displaying device, in the similar manner, an image undergoes the image quality adjusting processing before printing and then the processed image can be displayed on the displaying device.

However, the displaying device mounted in the printer generally has a small size and thus it was difficult for a user to precisely check the effect of the image quality adjusting processing by watching the image displayed on the displaying device.

SUMMARY

An advantage of some aspects of the invention is that it provides a printing apparatus which allows a user to effectively check the effect of image quality adjusting processing of an image before performing printing processing in a printer which can print an image after perform image quality processing for the image.

In order to accomplish the above-mentioned object, the printing apparatus has the following structure.

According to one aspect of the invention, there is provided a printing apparatus equipped with a displaying portion, which includes an image inputting unit for inputting an image, a display controlling unit which causes the image inputting unit to input the image when there is a demand for image display, sets correction amount for automatic image quality adjustment of the image which is inputted by image inputting unit, performs image quality adjusting processing with respect to the corresponding image by using the set correction amount, and displays the quality-adjusted image obtained through the image quality adjusting processing along with information about the correction amount on the displaying portion, and a print controlling unit which inputs the image to be printed by using the image inputting unit and performs printing processing of the inputted image when the printing of the image is demanded but the image quality adjusting processing is not demanded, and which inputs the image to be printed by using the image inputting unit, then performs the image quality adjusting processing of the inputted image, and finally performs the printing processing when the printing of the image is demanded and the image quality adjusting processing is also demanded.

In the printing apparatus, when a display of an image is demanded, the image is inputted, correction amount for automatic image quality adjustment of the inputted image is set, the inputted image undergoes image quality adjusting processing on the basis of the set correction amount, and the quality-adjusted image obtained through the image quality adjusting processing and information about the correction amount are displayed on the displaying portion. On the other hand, when the image quality adjusting processing is not demanded, the image to be printed is inputted and then the printing processing of the inputted image is performed. When the image quality adjusting processing is demanded, the image to be printed is inputted, the inputted image undergoes the image quality adjusting processing, and then the printing processing of the quality-adjusted image is performed.

Accordingly, a user can check the effect of the image quality adjusting processing on the displaying portion and then the printing is performed after the checking.

At this time, since the information about the correction amount is displayed along with the quality-adjusted image, a user can precisely check the image quality correction level which is difficult for a user to recognize by watching only the quality-adjusted image.

In such a printing apparatus, it is preferable that the display controlling unit be a means for displaying identification information which indicates the correction amount in multiple levels as information about the correction amount on the displaying portion.

In this way, a user can precisely check the effect of the image quality adjustment.

In the printing apparatus, it is preferable that the display controlling unit be a means for performing the image quality adjusting processing using the correction amount for automatic image quality adjustment and the correction amount for manual image quality adjustment when the correction amount for manual image quality adjustment is set by user's manual manipulation and displaying the quality-adjusted image obtained through the image quality adjusting processing on the displaying portion along with information about the correction amount based on the correction amount for automatic image quality adjustment and the correction amount for manual image quality adjustment.

With this processing, it is possible to respond to both the correction amount for automatic image quality adjustment and the correction amount for manual image quality adjustment.

In addition, in the printing apparatus, it is preferable that the display controlling unit be a means for displaying an original image of the inputted image and starting the image quality adjusting processing regardless of the user's manual manipulation when a display of the image is demanded, and switching a display of the original image with a display of the quality-adjusted image according to the user's manipulation when the image quality adjusting processing is finished.

With this processing, it is possible to make a user not feel lagging of the image quality adjusting processing.

Further, in the printing apparatus, it is preferable that the display controlling unit be a means for receiving a demand for image quality readjusting processing with respect the quality-adjusted image displayed on the displaying portion by a user's manipulation, performing the image quality readjusting processing with respect to the quality-adjusted image obtained through the image quality adjusting processing when the demand is received, and displaying the quality-readjusted image obtained through the image quality readjusting processing on the displaying portion.

With such processing, it is possible to respond to the user's demand for the image quality readjustment.

Further, in the printing apparatus, it is preferable that the print controlling unit be a means for performing printing processing after the image quality adjusting processing with respect to the inputted image is performed using the correction amount which is set by the display controlling unit.

With such a structure, it is possible to perform the printing processing at high speed because there is no need to newly set the correction amount when performing the printing processing.

According to another aspect of the invention, there is provided a controlling method of a printing apparatus equipped with a displaying portion, including (a) when a display of an image is demanded, inputting an image, setting correction amount for automatic image quality adjustment with respect to the inputted image, performing image quality adjusting processing with respect to the inputted image using the set correction amount, and displaying the quality-adjusted image obtained through the image quality adjusting processing along with information about the correction amount, which is used in the processing of the corresponding image, on the displaying portion, (b) when a display of an image is demanded but the image quality adjusting processing is not demanded, inputting the image to be printed, performing the image quality adjusting processing with respect to the inputted image, and performing the printing processing.

According to the controlling method of a printing apparatus, when the display of an image is demanded, an image is inputted, correction amount for automatic image quality adjustment for the inputted image is set, image quality adjusting processing is performed with respect to the inputted image using the set correction amount, and the quality-adjusted image obtained through the image quality adjusting processing is displayed on a displaying portion along with information about the correction amount. For instance, when the printing of the image is demanded but the image quality adjusting processing is not demanded, the image to be printed is inputted, and the printing processing for the inputted image is performed. On the other hand, when the printing of the image is demanded and the image quality adjusting processing for the image is also demanded, the image to be printed is inputted, the image quality adjusting processing is performed with respect to the inputted image, and then the printing processing is performed.

Accordingly, a user can perform the printing after checking the effect of the image quality adjusting processing on the displaying portion.

At this time, since both of the quality-adjusted image obtained through the image quality adjusting processing and information about the correction amount are displayed, a user can precisely check the correction level which is hardly checked by a user when the user checks it only watching the quality-adjusted image.

According to a further aspect of the invention there is provided a program which causes one or more computers to execute step of the controlling method of the printing apparatus.

In the program, it is preferable that the program may be recorded in a computer readable medium (for example, hard disk, read only memory (ROM), floppy disk (FD), compact disk (CD), digital versatile disk (DVD), et al.), may be transferred to a computer from another computer via a transmission medium (for example, Internet, local area network (LAN), et al.), or may be exchanged through another method.

In both cases in which the program is executed in a single computer and in which steps of the controlling method are separately performed in a plurality of computers, since the steps of the controlling method of the printing apparatus are performed, it is possible to obtain the same effect as the controlling method by the program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferable embodiments of the invention will be described with reference to the accompanying drawings.

Figure 1:
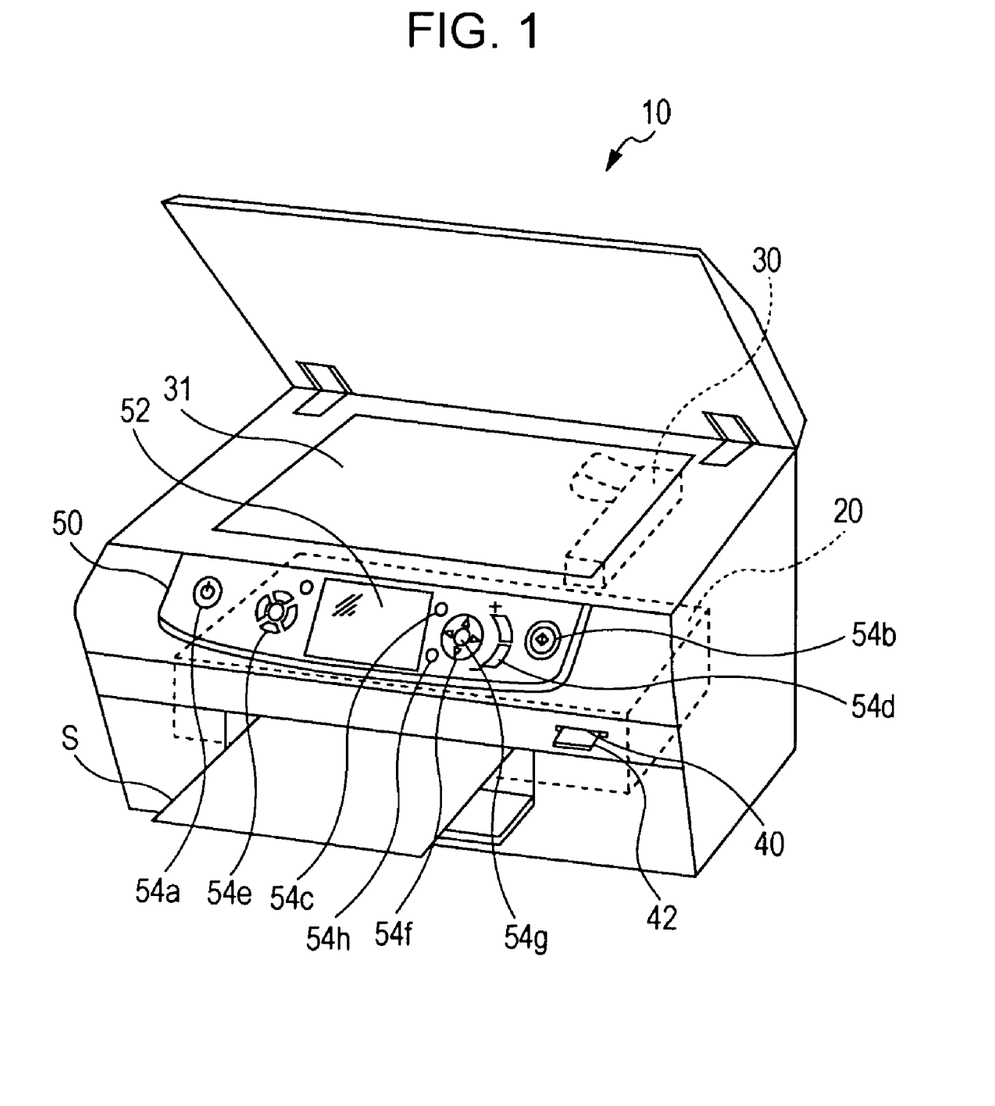
FIG. 1 is a schematic view illustrating the overall structure of a multi-function printer 10.
Figure 2:
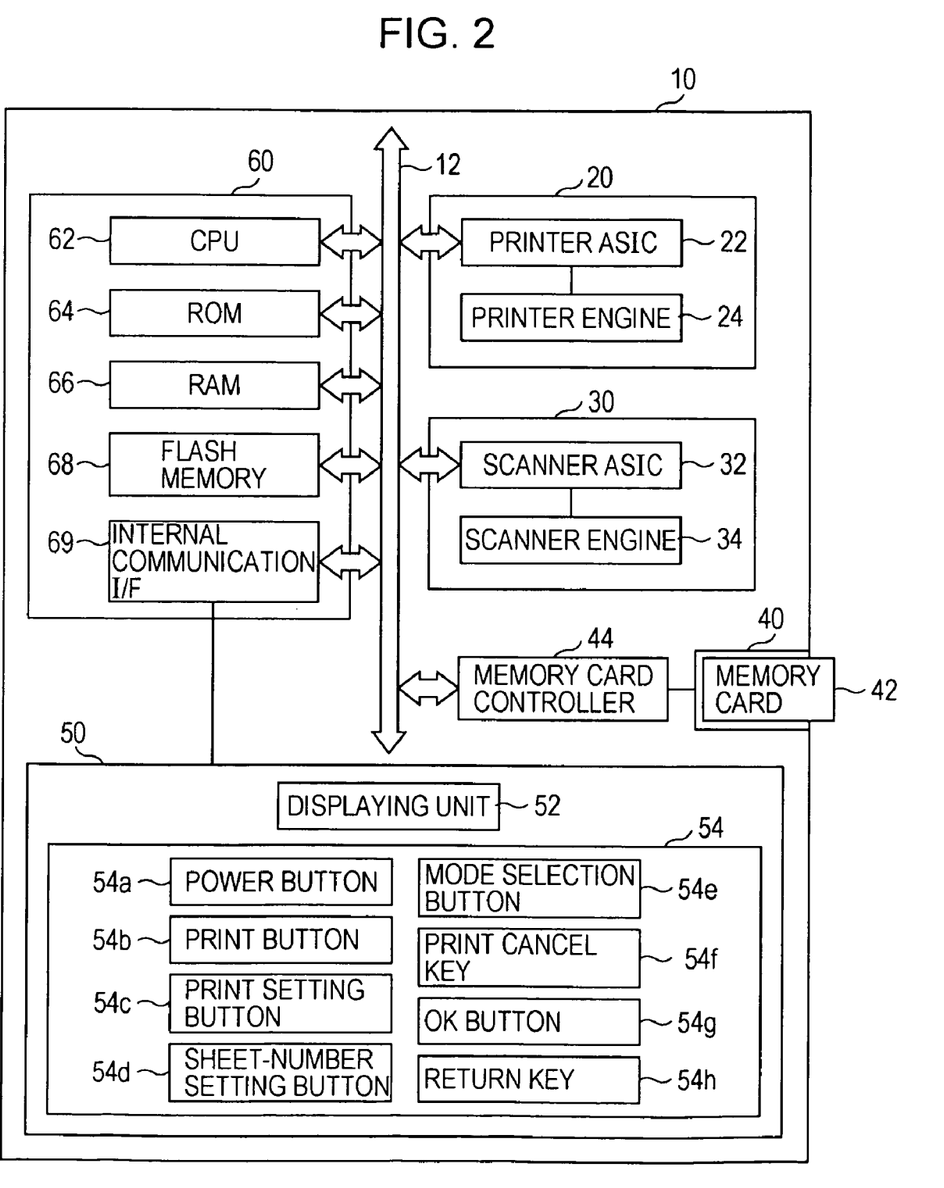
FIG. 2 is a block diagram illustrating the multi-function printer 10.

FIG. 1 is a perspective view illustrating appearance of a multifunction printer 10 which is an embodiment of a printing apparatus according to the invention. FIG. 2 is a block diagram illustrating the multifunction printer 10.

As shown in FIGS. 1 and 2, the multifunction printer 10 according to this embodiment consists of a printer unit 20 which performs printing on print paper S by a printing job, a scanner unit 30 which reads a manuscript mounted on a platen 31, a memory card controller 44 for exchanging data with a memory card 42 inserted in a memory card slot 40, a manipulation panel 50 which displays various information to a displaying portion 52 or receives user's instructions through user's manipulation of buttons 54, and a main controller 60 which controls the entire apparatus.

The multifunction printer 10 is structured such that the printer unit 20, the scanner unit 30, the memory card controller 44, and the main controller 60 exchange various control signals and data via a bus 12.

The printer unit 20 is equipped with a printer ASIC 22 and a printer engine 24.

The printer ASIC 22 is an integrated circuit for controlling the printer engine 24, and controls the printer engine 24 to print an image file which is an object of the instruction on paper S when receiving a printing instruction from the main controller 60.

In addition, the printer engine 24 is structured to have a function of a color printer which is based on a known ink-jet system which ejects ink to the paper from a print head for printing.

ASIC stands for Application Specific Integrated Circuit.

The scanner unit 30 is equipped with a scanner ASIC 32 and a scanner engine 34.

The scanner ASIC 32 is an integrated circuit for controlling the scanner engine 34, and controls the scanner engine 34 to read a manuscript mounted on the platen 32 as image data when receiving a scanning instruction from the main controller 60.

In addition, the scanner engine 34 is constituted from a known image scanner, and is equipped with a color image sensor which splits light reflected from the manuscript into red (R), green (G), and blue (B) colors to produce scan data.

The memory card controller 44 performs input and output of data to and from the memory card 42 inserted into the memory card slot 40 arranged alongside the manipulation panel 50.

The memory card controller 44 reads a file stored in the memory card 42 when the memory card 42 is connected with the memory card slot 40, sends the file to the main controller 60, receives an instruction from the main controller 60, and writes data into the memory card 42 according to the instruction.

The manipulation panel 50 is provided with the displaying portion 52 and the buttons 54.

The displaying portion 52 is a liquid crystal display. Various manipulation screens for enabling menu selection and menu setting are displayed on the displaying portion 52.

The buttons 54 include a power supply button 54a for switching on and off power, a print button 54b for performing printing, a print setting button 54c for performing various settings, such as print paper and quality, a print copy number setting button 54d for setting the number of print copies of the selected image, a mode selection button 54e for selecting a mode, left, right, up, and down arrow keys 54f for selecting various items or settings, an OK button 54g for effecting the selected setting, and a return button 54h for returning the menu screen to a previous screen. The buttons 54 are made such that user's instructions are inputted to the main controller 60 via an internal communication interface 69.

Here, modes that can be selected by the mode selection button 54e include a copying mode for copying the manuscript set on the platen 32 by scanning the manuscript, a memory card mode for printing an image stored in the memory card 42 or saving the manuscript in the memory card 42 as data by scanning the manuscript, a film mode for scanning and printing a photograph film or saving the scanned data into the memory card 42, and a CD/DVD driving mode for printing the image stored in the CD/DVD.

The main controller 60 is constituted from a microprocessor having a central processing unit (CPU) 62 as a core, and is equipped with a read only memory (ROM) 64 which stores various processing programs, various kinds of data, and various kinds of tables therein, a random access memory (RAM) 66 which temporarily stores scan data or print data, a flash memory 68 into which data can be electrically rewritten and which maintains data even when power is not supplied, and the internal communication interface 69 which enables communication with the manipulation panel 50. These elements are connected to each other via the bus 12 so that signals can be exchanged.

The RAM 66 has a display data storage region for storing display image data therein and a print data storage region for storing print image data therein.

The main controller 60 receives various operation signals and various detection signals from the printer unit 20, the scanner unit 30, and the memory card controller 44, or receives manipulation signals generated in response to the manipulation of the buttons 54 of the manipulation panel 50.

In addition, an image file is read out from the memory card 42, an instruction outputted to the main controller 60 is further outputted to the memory card controller 44, an instruction is outputted to the printer unit 20 so that the printing of the image data is performed, an instruction is outputted to the scanner unit 30 so that the manuscript mounted on the platen 36 is read out as the image data according to a scanning instruction made by the use of the buttons 54 of the manipulation panel 50, and control instructions for controlling the displaying portion 52 are outputted to the manipulation panel 50.

Next, operation of the multifunction printer 10 structured in the above-mentioned manner, and printing operation for performing printing after checking the image stored in the memory card 42 using the displaying portion 52 will be described.

Figure 3:
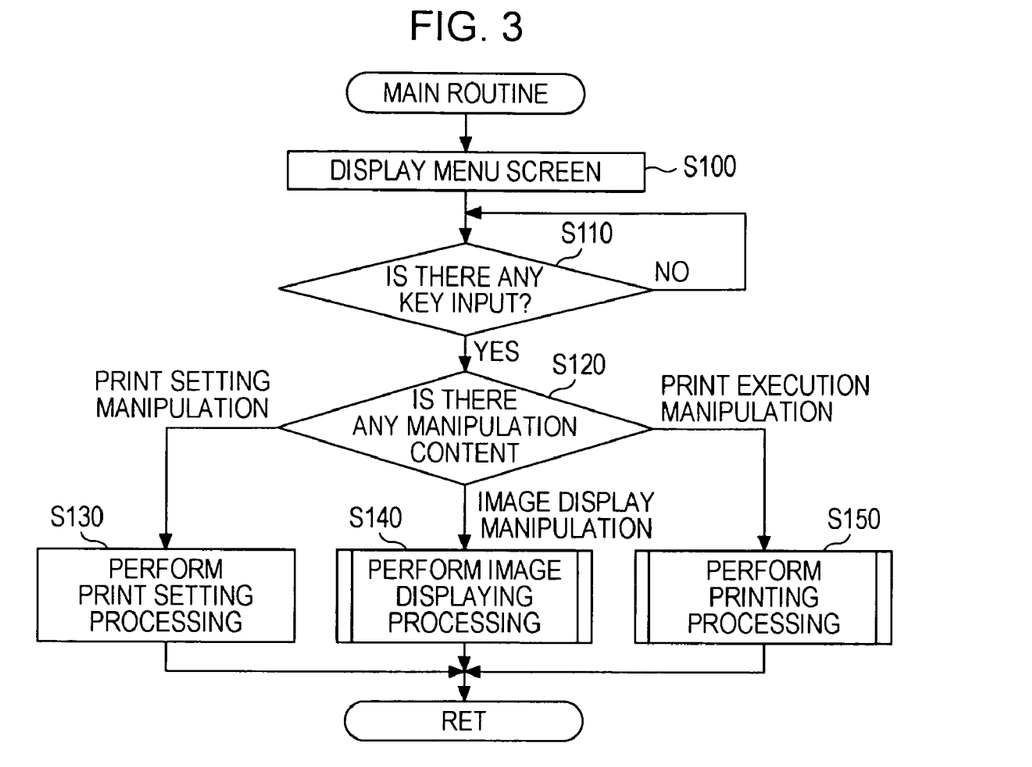
FIG. 3 is a flowchart illustrating an exemplary main routine.

FIG. 3 shows a flowchart of a main routine executed by the CPU 62 of the multifunction printer 10.

This processing is repeatedly performed at a predetermined time interval.

When the main routine is executed, the CPU 62 of the multifunction printer 10 displays a menu screen (step S100), and performs processing of waiting a key input (Step S110).

Even though not shown in the figure, for example there are various menu items, such as an image display mode for displaying images stored in the memory card 62 on the displaying portion 52 and allowing selection of an image to be printed, a print setting mode for performing various printing settings, and a print performing mode for performing printing of the selected image in the menu screen. These menus are selected by using the print button 54b, the print setting button 54c, and the arrow keys 54f.

When the key input is performed, it is determined which mode is selected from various modes including the print setting mode, the image displaying mode, the print performing mode (Step S120).

In step S120, when the print setting mode is selected, print setting processing is performed in a manner such that a print setting screen is displayed and a print setting is performed (step S130), and the main routine ends.

Figure 4:
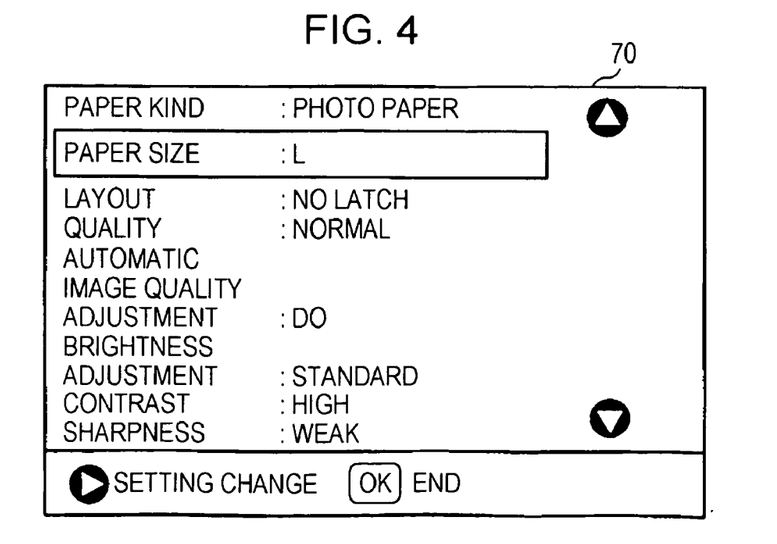
FIG. 4 is an explanatory view illustrating an example of a print setting screen 70.

FIG. 4 shows an example of a print setting screen 70.

As shown in FIG. 4, the print setting screen 70 includes selection items, such as paper kinds (setting values include photo paper, plain paper, and matt paper), paper size (setting values include L-size, postcard-size, and A4-size), layout (setting values include no latch and presence of latch), print quality (setting values include fast, normal, clean), automatic image quality adjustment for adjusting an image so as to have the best color tone (setting values: DO and UNDO), brightness adjustment (setting values: brighter, bright, normal, dark, darker), contrast (setting values: normal, strong, and weak), and sharpness (setting values: sharpness strong, sharpness weak, normal, soft focus weak, and soft focus strong). One of the setting items is selected by combining cursors, i.e. by upward and downward manipulations of the arrow keys 54f, and one of the setting values of each setting item can be selected by rightward manipulation of the arrow keys 54f.

In step S120, when the image displaying mode is selected, the image displaying processing is performed (step S140) and the main routine ends.

Figure 5:
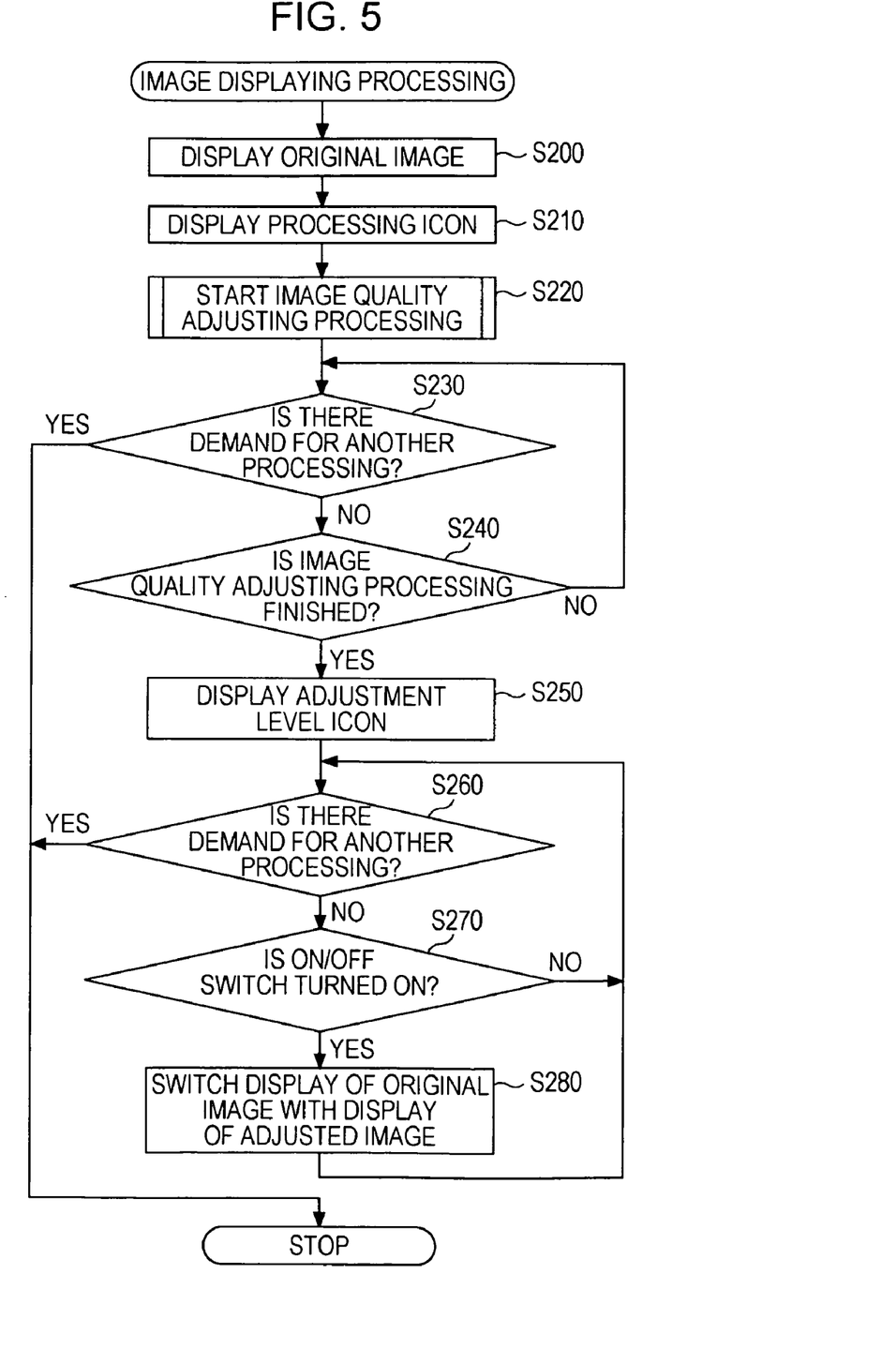
FIG. 5 is a flowchart illustrating an example of image displaying processing.

FIG. 5 is a flowchart illustrating an example of the image displaying processing performed by the main controller 60.

When the image displaying processing of FIG. 5 is performed, the CPU 62 of the main controller 60 performs processing of displaying an original image of the selected image (step S200).

In greater detail, an image of images stored in the memory card 42 is read out and is then developed in the display data storage region of the RAM 66. Then, resolution changing processing in which the developed image is changed to fit the display of the displaying portion 52 is performed (processing for thinning out the number of pixels).

Further, when the read image is YCbCr data compressed in JPEG format, the image development is performed by decoding JPEG data and changing the YCbCr data to RGB data using an YCbCr-RGB conversion table.

In this manner, when the original image is displayed, an in-processing icon which indicates the middle of processing is displayed (step S210), and the image quality adjusting processing is started (step S220).

The image quality adjusting processing is performed regardless of the setting of the automatic image quality adjustment, i.e. regardless that items of the automatic image quality adjustment is "DO" or "UNDO" in the print setting screen 70 exemplarily shown in FIG. 4.

Here, description of the image displaying processing shown in FIG. 5 is suspended and image quality adjusting processing will be described.

Figure 6:
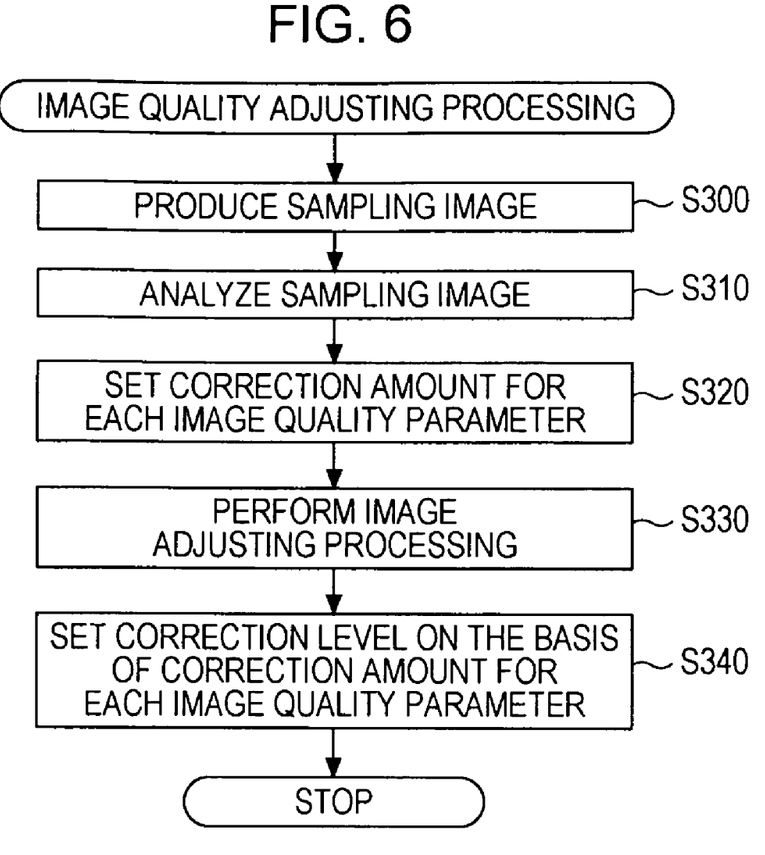
FIG. 6 is a flowchart illustrating an example of image quality adjusting processing.

FIG. 6 is a flowchart illustrating an example of the image quality adjusting processing performed by the main controller 60. When the image quality adjusting processing is performed, the CPU 62 of the main controller 60 produces sampling image data first (step S300), and analyzes the produced sampling image data (step S310).

Here, production of the sampling image data means development of an image selected from the images stored in the memory card 42 in the print data storage region, and resolution changing processing (processing for thinning out the number of pixels) for changing resolution of the developed image to fit the analysis of the image for image quality adjustment is performed.

In addition, analysis of the sampling image data is processing for abstracting a specific amount of each image quality parameter of the image data. In greater detail, the analysis of the sampling image data is performed by obtaining an RGB histogram of sampling image data and a histogram of brightness, and obtaining specific amount of each image quality parameter, such as maximum luminosity, minimum luminosity, brightness, chroma saturation, color balance, highlight, shadow, contrast, and sharpness.

Next, a correction amount is set for each image quality parameter (step S320), and image quality adjustment is performed using the set correction amount (step S330).

The correction amount for each image quality parameter is set on the basis of the specific amount of each image quality parameter, which is obtained by analyzing the sampling image data and a target value which is predetermined as the specific amount of each image quality parameter, which a desirable image quality has. In greater detail, the correction value is set such that the correction value of each image quality parameter of the sampling image data is equal or similar to the target value.

In greater detail, the image quality adjusting processing is performed by changing the characteristic of a tone curve using the set correction amount, and producing display image data using the characteristic of the changed tone curve.

Accordingly, a correction level is set on the basis of the correction amount which is set for each image quality parameter (step S340) and the main processing ends.

Here, with this embodiment, the relationship between average values of correction amounts (correction amounts A) which are set for every image quality parameter and correction levels are obtained and stored as a map in the ROM 64, and the correction level corresponding to the correction amount A is calculated from the map.

Figure 7:
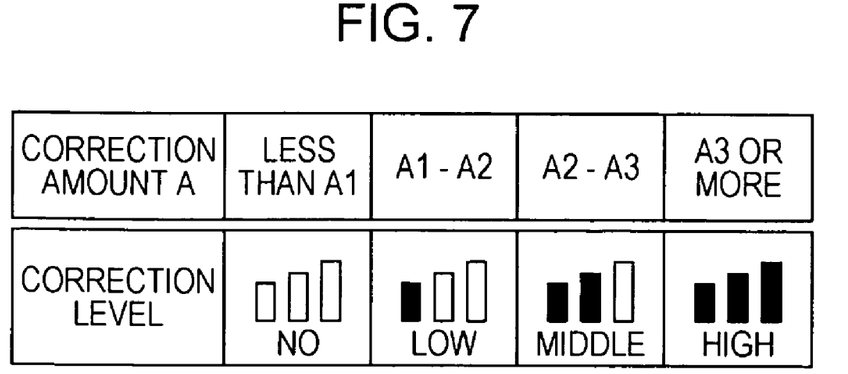
FIG. 7 is an explanatory view illustrating a correction level setting method.

FIG. 7 shows an example of the map.

As shown in FIG. 7, when the correction amount A is less than the value A1, the correction level becomes "no." When the correction amount A is the value A1 or more and less than the value A2, the correction level becomes "weak." When the correction amount A1 is the value A2 or more and less than the value A3, the correction level becomes "middle." When the correction amount A is the value A3 or more, the correction level becomes "strong."

As the correction amount A, the averages may be obtained with different weights for every image quality parameter.

Returning to step S220 of the image displaying processing shown in FIG. 5, when execution of the image quality adjusting processing is started in this manner, it is determined whether another processing (for example, print setting mode or print performing mode) is demanded or not (step S230), and whether the image quality adjusting processing started in step S220 is finished or not (step S240).

When another processing is demanded, the main processing ends.

In this case, data produced in the middle of performing the image quality adjusting processing is discarded.

When the image quality adjusting processing is finished and another processing is not demanded, a correction level icon corresponding to the correction level set in step S340 of the image quality adjusting processing of FIG. 6 is displayed on the displaying portion 52 instead of the in-processing icon (step S250).

With this embodiment, the correction level icon is shown in an antenna form. As shown in FIG. 7, when the correction level is "no," the antenna level shows no bar. When the correction level is "weak," the antennal level shows one bar. When the correction level is "middle," the antenna level shows 2 bars. When the correction level is "strong level," the antenna level shows 3 bars.

In this manner, it is possible to help a user check completion of the image quality adjusting processing and the effect of the image quality adjusting processing by changing an icon displayed on the displaying portion 52 from the in-processing icon to the correction level icon.

When the correction level icon is displayed, it is determined whether another processing is demanded (step S260) and where the on-off switching button (corresponding to the arrow keys 54ƒ with this embodiment) is in the on state or in the off state (step S270). In the case in which another processing is demanded, the processing ends. On the other hand, in the case in which the on-off switching button is in the on state while another processing is not demanded, the original image is switched with the quality-adjusted image obtained through the image quality adjusting processing (step S280), and the processing flow returns to step S260.

Figure 8:
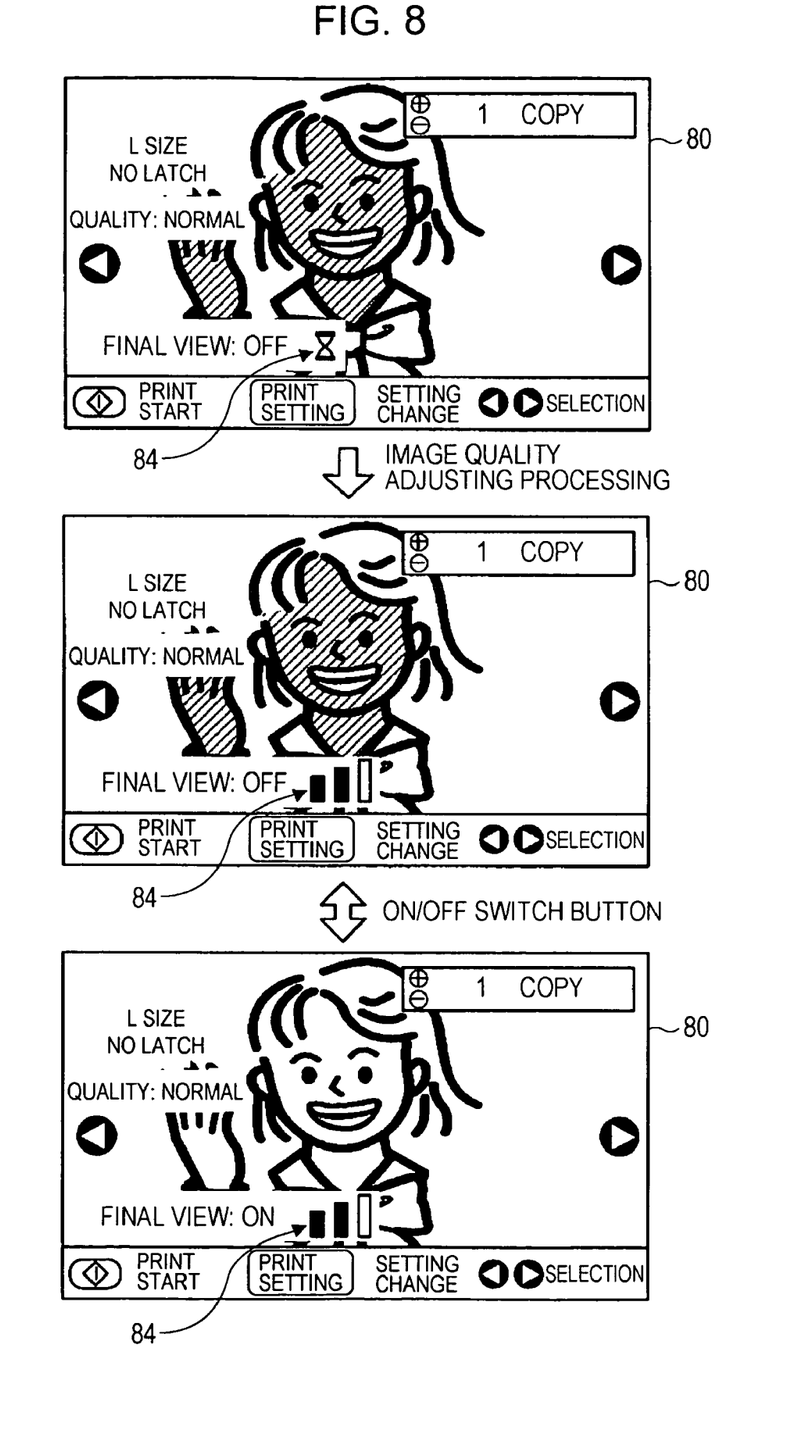
FIG. 8 is an explanatory view illustrating an example of an image displaying screen 80 displayed in the middle of performing the image displaying processing.

FIG. 8 shows an example of a screen displayed on the displaying portion 42 by the image displaying processing of FIG. 5.

As shown in FIG. 8, when the image displaying mode is instructed, the original image of the image selected by the user is displayed on the image displaying screen 80 and the in-processing icon 82 is displayed. Thus, the image quality adjusting processing is started (step S200 through S220).

Here, the item "final view: off" of FIG. 8 means the state in which the original image which has not undergone the image quality adjusting processing is displayed.

When the image quality adjusting processing is finished, the display of the in-processing icon 82 is eliminated and the antenna icon 84 showing the correction level of the image quality adjusting processing is displayed (steps S240 and S250). Further, every when the on-off switching button is pressed, the display of the screen is switched between the original image and the quality-adjusted image (steps S270 and S280).

Since such processing is started as the original image is displayed even in the case in which a user selects the setting value "UNDO" of the setting item "automatic image quality adjustment" in the print setting screen 70 shown in FIG. 4, users can check the effect of the image quality adjusting processing from the image displaying screen 80 without feeling lagging of the image quality adjusting processing in comparison with the case in which the users make an instruction to start the image quality adjusting processing by themselves. In such a state, it is possible to select "DO" or "UNDO" of the automatic quality adjustment by pressing the print setting button 54*c* in the screen.

At this time, the correction level is displayed with the antenna icon 84 as the effect of the image quality adjusting processing, and the original image and the quality-adjusted image obtained through the image quality adjusting processing are switched to each other every when the on-off switching button is pressed. Accordingly, it is possible for users to easily check the difference between the original image and the quality-adjusted image obtained through the image quality adjusting processing.

Further, the image displayed in the image displaying screen 80 can be selected and printed in a manner such that the number of print copies of the image displayed on the displaying portion is set by the use of the print copy number setting button 54*d* in the image displaying screen 80, and the print button 54*b* is pressed.

When the print performing mode is selected in step S120 of the main routine, the printing processing is performed (step S150) and the main routine ends.

Figure 9:
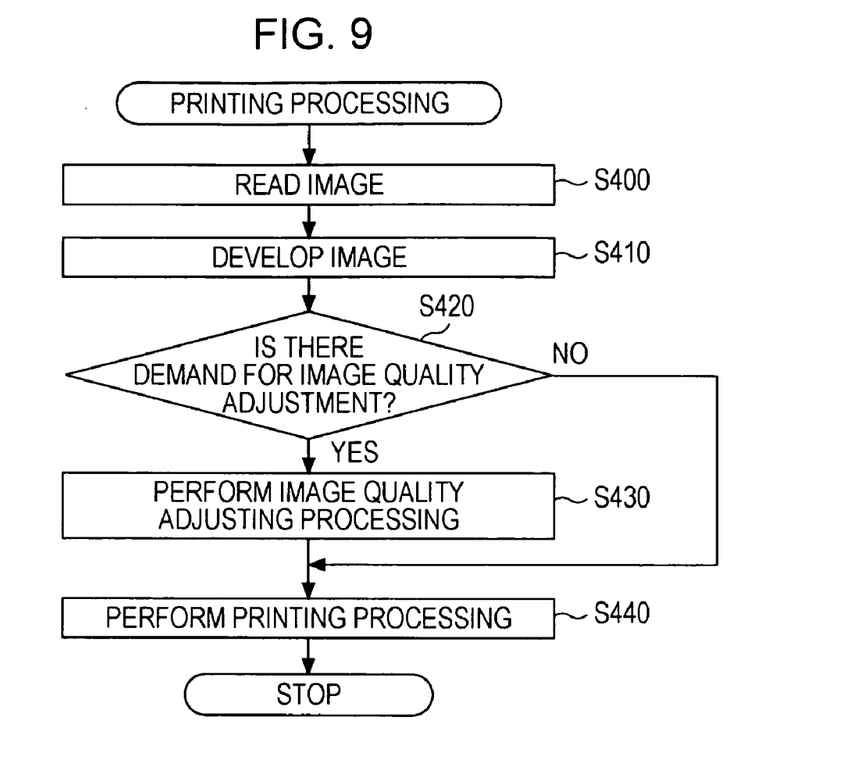
FIG. 9 is a flowchart illustrating an example of printing processing.

FIG. 9 is a flowchart illustrating an example of the printing processing.

When the printing processing is executed, the CPU 62 of the main controller 60 reads the image selected by a user from the memory card 42 (step S400), and the image which is read out is developed in the print data storage region of the RAM 66 (step S410).

Next, it is determined whether the automatic image quality adjusting processing is demanded by a user, i.e. whether the automatic image quality adjustment is set with "DO" or not in the print setting screen 70 (step S420). When the automatic image quality adjusting processing is demanded, the image quality adjusting processing is performed using the correction amounts for every image quality parameter set in step S320 of the image quality adjusting processing of FIG. 5 to produce print image data (step S430), printing processing is performed using the produced print image data (step S440), and the main processing ends.

The printing processing is performed such that half tone processing or RGB-CMYK color conversion processing is performed with respect to the produced print image data, print data is produced by adding a print control command to the print image data, and the print data is outputted to the printer ASIC 22.

In addition, when there is no demand for the automatic image quality adjusting processing, the printing processing is performed without performing the image quality adjusting processing (step S440) and the main processing ends.

Hereinafter, the relationship between elements of the embodiment and elements of the invention will be described.

The memory card slot 40 and the memory card controller 44 of the embodiment correspond to an image inputting unit, the main controller 60 which performs the image displaying processing of FIG. 5 and the image quality adjusting processing of FIG. 6 correspond to a display controlling unit, and the main controller 60 which performs the printing processing of FIG. 9 corresponds to a print controlling unit.

With this embodiment, a method of controlling the printing apparatus of the invention will be described by referring to the operation of the multifunction printer 10.

According to the multifunction printer 10 of the above-mentioned embodiment, when the image displaying mode is selected, the original image of the selected image is displayed on the image displaying screen, the image quality adjusting processing which performs the image quality adjustment by setting correction amounts for the selected image for every image quality parameter is started, and the correction level is displayed in the image displaying screen when the image quality adjusting processing is finished. Accordingly, users can check the effect of the image quality adjusting processing of the image to be printed from the displaying portion 52 before performing printing.

That is, it is difficult for users to know how the image is adjusted by the image quality adjusting processing by only watching the adjusted image, which is displayed in the image displaying screen. However, it is possible to help a user precisely check the correction degree by displaying the correction level in the image displaying screen.

Furthermore, since the displays of the original image and the quality-adjusted image obtained through the image quality adjustment are switched by user's direction (by the use of the on-off switching button), the original image and the quality-adjusted image can be directly compared with each other by the users.

In addition, the image quality adjusting processing is started as soon as the original image is displayed regardless of user's selection between "DO" and "UNDO" of the automatic image quality adjustment in the print setting screen. Accordingly, users may not feel lagging of the image quality adjusting processing in comparison with the case in which the original image is displayed first, a user makes an instruction to perform the automatic image quality adjustment, and finally the image quality adjusting processing is started.

With this embodiment, the correction level is expressed by the correction level icon 84 which shows the correction level in four levels (zero bar of antenna, one bar of antenna, two bars of antenna, and three bars of antenna) on the basis of the correction amount A of the image quality parameter of the selected image, but the number of levels showing the correction degree is not limited to four but may be any number as long as the number is two or more. Alternatively, the correction amount A may be directly displayed.

Further, expression of the correction level is not limited to the antenna icon but may be any diagrams, numbers, or characters as long as those can be identified by users as the correction level. In addition, the correction level may be expressed by light, color, voice, et al.

With this embodiment, the image quality adjusting processing (step S430) of the printing processing of FIG. 9 is performed by using the correction amount set in the image quality adjusting processing (step S320) of FIG. 6, but may be performed by newly setting the correction amounts for every image quality parameter.

With this embodiment, the correction level is set on the basis of the correction amount A used in the automatic image quality adjusting processing, but may be set on the basis of both of the correction amount A used in the automatic image quality adjusting processing and the correction amount set by users in the manual image quality adjusting processing in an apparatus in which the image quality adjustment can be performed according to user's manual setting with respect to items different from the adjustment item of the automatic image quality adjusting processing as well as the automatic image quality adjusting processing can be performed and image quality adjustment.

Figure 10:
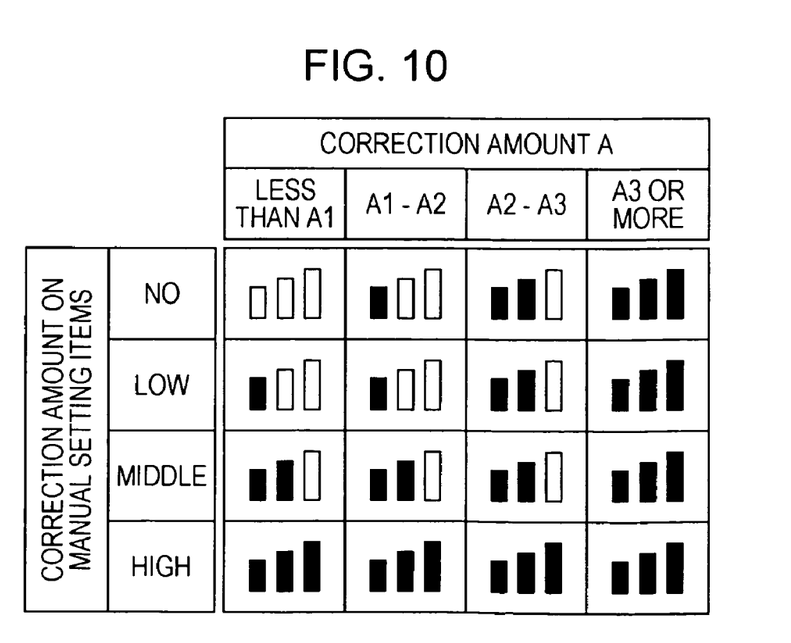
FIG. 10 is an explanatory view illustrating an example of a correction level setting method.

FIG. 10 shows an example of the relationship between the correction amount A used in the automatic image quality adjusting processing and the correction level used in the manual image quality adjusting processing.

In this example, as shown in FIG. 10, the correction level is selected from the correction level determined on the basis of the correction amount A used in the automatic image quality adjusting processing and the correction level determined on the basis of the correction amount used in the manual image quality adjusting processing. That is, stronger correction level is set.

With this embodiment, when the image displaying mode is instructed, the original image is displayed and the image quality adjusting processing of FIG. 6 is performed. When the image quality adjusting processing is finished, the display change between the original image and the quality-adjusted image is performed by manipulation of the on-off switching button. However, when a user sets readjustment of the image after the quality-adjusted image obtained through the image quality adjusting processing is displayed on the displaying portion 52, image quality readjusting processing may be performed.

Figure 11:
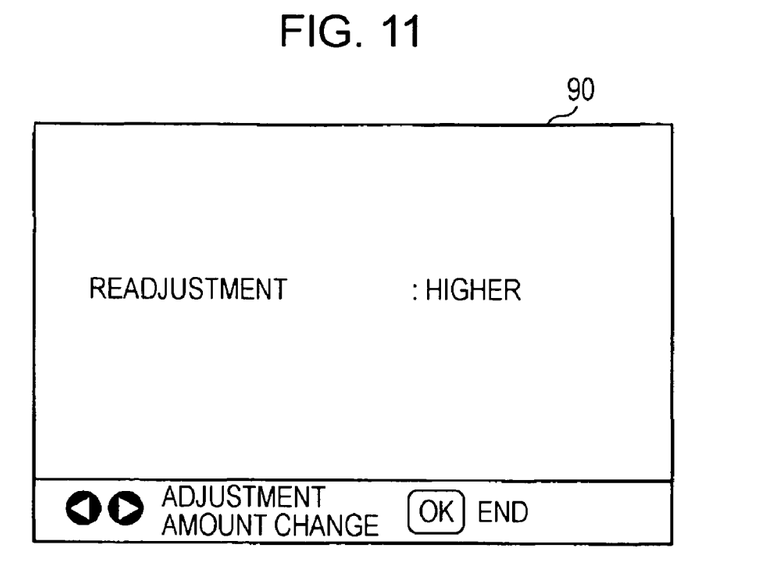
FIG. 11 is an explanatory view illustrating an example of an image quality readjustment amount setting screen 90.

In this case, the setting of the readjustment amount is performed using an image quality readjustment amount setting screen 90 of FIG. 11 such that the readjustment amount is set by selecting any of items "weaker," "weak," and "stronger" by leftward and rightward manipulation of the arrow keys 54f, and clicking the OK button 54g.

Figure 12:
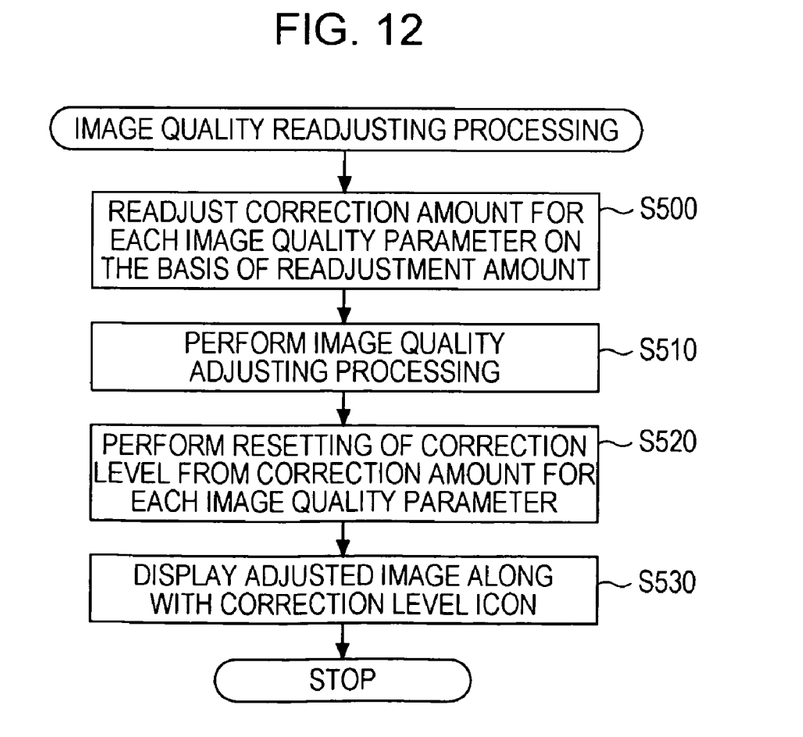
FIG. 12 is a flowchart illustrating an example of image quality readjusting processing.

FIG. 12 is a flowchart illustrating an example of the image quality readjusting processing performed by the main controller 60.

This processing is performed if the instruction of the image quality readjustment is not issued at the time between steps S260 to S280 of the image displaying processing of FIG. 5.

If the image quality readjusting processing is performed, the CPU 62 of the main controller 60 performs processing for resetting the correction amounts for every image quality parameter on the basis of the readjustment amount selected by a user (step S500).

This processing can be performed by applying coefficients depending on the readjustment amounts selected by the user to the current correction amounts for every image quality parameter. Next, the image quality adjusting processing is performed using the reset correction amount (step S510), the correction level is reset using the relationship shown in FIG. 7 on the basis of the correction amounts for every image quality parameters (step S520), the correction level icon of the reset correction level and the quality-readjusted image obtained through the image quality readjusting processing are displayed in the image displaying screen (step S530), and the processing ends.

In the description of the embodiment, the invention is applied to the multifunction printer 10 equipped with the printer unit 20 and the scanner unit 30, but may be applied to typical printers which are not equipped with scanner units.

In the description of the embodiment, the invention is applied to a full-color printer 10 using ink as a coloring agent and employing an ink-jet system, but may be applied to a color laser printer using toner as a coloring agent and employing an electro-photographic system or a color printer using a ink ribbon as a coloring agent and employing a thermal transfer system.

Besides the printing apparatus such as FAX machine, the invention may be applied to an image displaying apparatus, such as a displaying portion of a digital still camera or a photo-view.

The description in the embodiment mainly refers the printing apparatus, but the invention can be implemented in the form of a controlling method of a printing apparatus or a program which causes one or more computers to perform steps of the controlling method of the printing apparatus.

What is claimed is:

1. A printing apparatus having a displaying portion, comprising:
    an image inputting unit for receiving an image;
    a display controlling unit, in communication with the image inputting unit, configured to automatically set a first correction amount for adjusting quality of the image, receive a second correction amount for adjusting the quality of the image, automatically perform image quality adjusting processing with respect to the image using a third correction amount that is based on the first and second correction amounts, and display the quality-adjusted image obtained through the image quality adjusting processing along with information indicative of the amount of correction applied to the image on the displaying portion; and
    a print controlling unit configured to perform printing processing on the quality-adjusted image.

2. The printing apparatus according to claim 1, wherein the display controlling unit is configured to switch alternately display the image in its uncorrected form and the quality-adjusted image based on user manipulation after the image quality adjusting processing is finished.

3. The printing apparatus according to claim 2, wherein the display controlling unit receives a command for readjusting the quality of the quality-adjusted image and performs image quality readjusting processing with respect to the quality-adjusted image, and displays a quality-readjusted image obtained through the image quality readjusting processing.

4. A method for controlling a printing apparatus having a displaying portion, the method comprising:
    (a) receiving an image;
    (b) controlling a display to automatically set a first correction amount for adjusting quality of the image, receive a second correction amount for adjusting the quality of the image, automatically perform image quality adjusting processing with respect to the image using a third correction amount that is based on the first and second correction amounts, and display on the displaying portion the quality-adjusted image obtained through the image quality adjusting processing along with information indicative of the amount of correction applied to the image; and (c) performing printing processing on the quality-adjusted image.

5. The printing apparatus according to claim 1, wherein the information is in antenna form indicating the amount of correction as a level of correction.

6. The method according to claim 4, wherein the information is in antenna form indicating the amount of correction as a level of correction.

7. The printing apparatus according to claim 5, wherein the information comprises a number of level icons indicating the amount of correction, the number of level icons being zero indicating no amount of correction, and each subsequent number of level icons indicating a subsequently higher amount of correction.

8. The printing apparatus according to claim 6, wherein the information comprises a number of level icons indicating the amount of correction, the number of level icons being zero indicating no amount of correction, and each subsequent number of level icons indicating a subsequently higher amount of correction.

* * * * *